W. M. PALMER.
Thrashing Machine.

Patented Aug. 1, 1854.

W. M. PALMER.
Thrashing Machine.

Patented Aug. 1, 1854.

UNITED STATES PATENT OFFICE.

WILLIAM M. PALMER, OF PALMYRA, MAINE.

THRESHING-MACHINE.

Specification of Letters Patent No. 11,439, dated August 1, 1854.

*To all whom it may concern:*

Be it known that I, WILLIAM M. PALMER, of Palmyra, in the county of Somerset and State of Maine, have invented a new and useful Improvement on the Machine for Separating Grain from the Straw, called "Palmer's Separator;" and I do hereby declare that the following is a full, clear, and exact description of the construction and operation of the same, reference being had to the annexed drawings making a part of this specification, in which—

Figure 1, is a longitudinal section showing its working parts divested of all its framework and connections. A, is the threshing cylinder, B, the concave, C, a series of wires projecting from the concave an inch or two above the endless belt or straw carrier D D, to protect it, from the dash of the grain when thrown out by the cylinder A. D, D, an endless belt of slats or lags, for carrying forward the straw and grain. These are made of slats, or rods of wood with the under sides narrowed to a triangular point, and attached to endless. K, is a similar screen to that of I, but placed more horizontal than I, which position causes an eddy in the current of wind from the fan, and renders it more efficient in cleansing the grain. The tailings and other stuff that passes over the screen I, passes through this on to the inclined board M. L, an inclined plane below the sieve I, having a narrow board projecting up nearly touching I. M, an inclined board to receive what passes through K. N, a fine sieve or screen attached to M, to separate foul or fine seeds from the grain. O, a fine screen which receives the grain as it passes from the inclined plane L. P, a coarse screen which receives what grain slides off and passes from the fine screen O. Q, the fan or blower, which throws the wind up between I, and L. R, grain box. S, seed box. T, a board to guide the grain into the box. W, a case or bonnet of zinc or sheet iron around the end of D, D.

Fig. 2, is a longitudinal section of the shoe, detached from the other parts. The references are the same as in the preceding description, with the exception of the shaking apparatus. V, is a pulley, to the shaft of which is attached a crank and to this crank a rod U. Bands passing over pulleys and rests on the board e at first starting the straw. E, a drum or roller of slats at the end of the endless belt, and almost in contact with it, to throw off the straw from the machine. F, a board or table placed in an inclining position, on which the grain falls as it passes through the belt of slats, and down which the grain is scraped by the slats as they pass down in contact with its surface, into the shoe to be winnowed. G, is a reel or fan placed above the straw carrier, to keep the straw near the belts and aid in passing it along to the end of the machine. H, the platform of the shoe cut into beveled ridges or ledges on to which the grain falls from the inclined plane F, and from which it passes on to the sieves or screws to be winnowed. I, is the first sieve or screen, made of sheet zinc, or sheet iron or tin and punched full of round holes, through which the grain passes, falling on the inclined board L, receiving the wind from the fan Q, which passes between the screens I and K, and the board L. U, the rod attached to a pin in the side of the shoe a little above the screen O, and to the crank at V. There is a rod like this on the other side. The shoe is suspended to the main part of the machine by two small iron rods, on each side, as represented by X, X, Fig. 3. These rods U, by means of the crank motion at V, shake the shoe backward and forward, longitudinally, and not sidewise as in the ordinary way.

Figure 2:
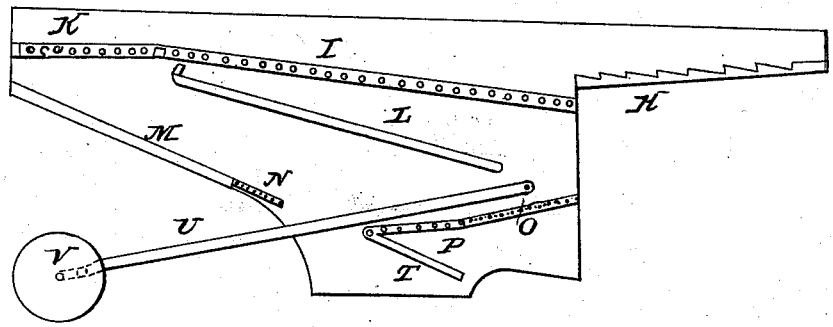
Figure 1:
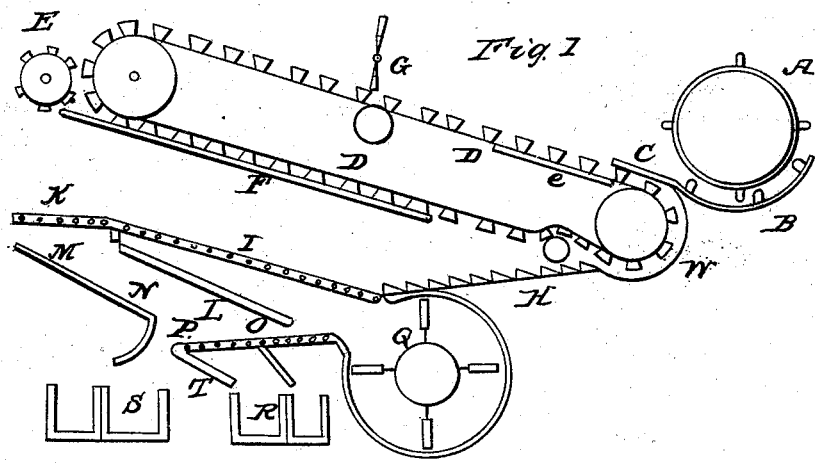
Figure 4:
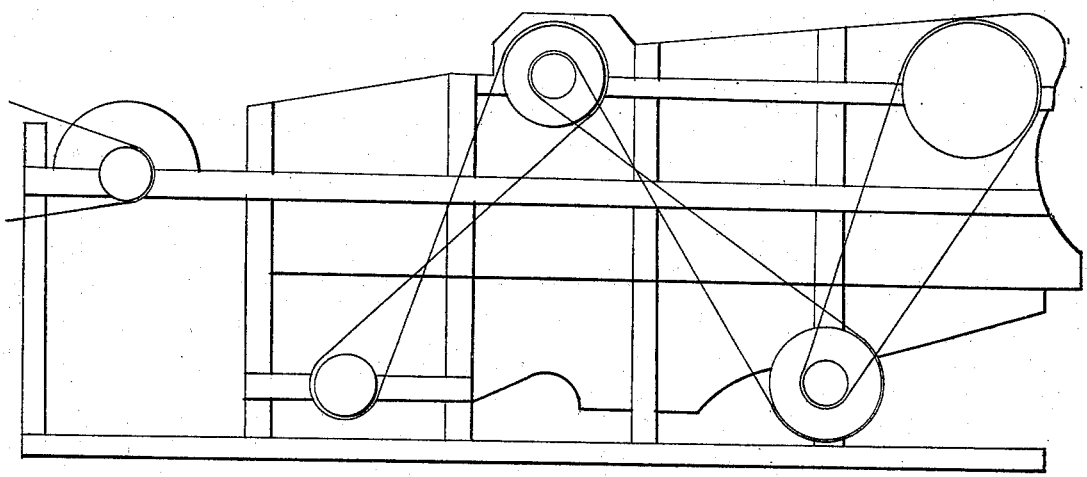
Fig. 4, is a side view, of the side opposite to that shown at Fig. 3 in order to exhibit the belting arrangements.
Figure 3:
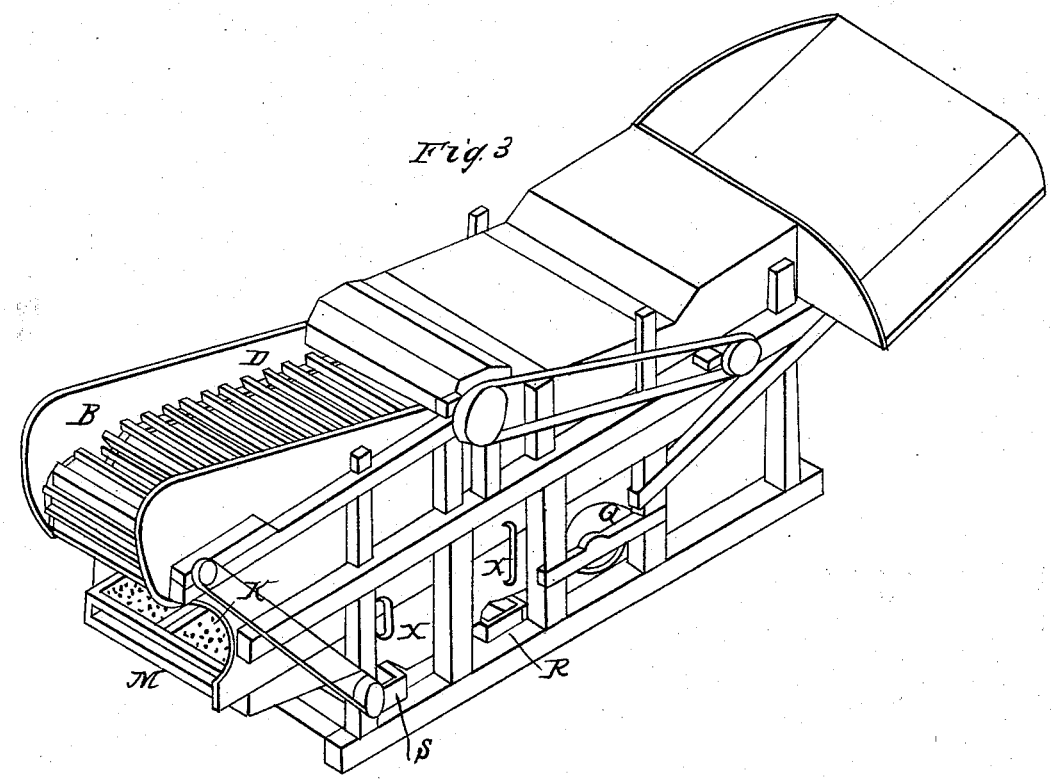
Fig. 3, is an isometrical perspective view of the machine; reference being the same to the parts visible as in Fig. 1.

Operation: The grain is passed into the thresher A, B, is threshed, and thrown upon the wires or fingers C, from which it is taken by the endless belt D, D, and in its passage up; the grain is separated from the straw, and falls through upon the inclined plane F, and the straw being carried forward is thrown off by the cylinder E. The grain is scraped down by the returning slats D along the inclined plane F, from which it falls upon the platform of the shoe H, from this, it passes on to the screens I, and K, and receives the wind from the fan Q, which blows off the chaff, and it then dropping through the screens I, and K, falls upon the inclined planes L and M from which it passes on to the finer screens O and N where it is separated from foul seeds and then passes into the receivers below R and S.

I claim—

The combination of the screens T, K, N, P, and O, with the chutes M and L, for screening and separating the grain as set forth.

WM. M. PALMER.

Witnesses:
E. HOLMES,
E. W. KELLY.